United States Patent
Campbell et al.

(10) Patent No.: US 11,729,472 B2
(45) Date of Patent: Aug. 15, 2023

(54) CONTENT ACCESS BASED ON LOCATION TOKEN

(71) Applicant: International Business Machines Corporation, Armonk, NY (US)

(72) Inventors: Eric J. Campbell, Rochester, MN (US); Chad Albertson, Rochester, MN (US); Christopher Steffen, Rochester, MN (US); Nicholas Ollerich, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 16/701,306

(22) Filed: Dec. 3, 2019

(65) Prior Publication Data

US 2021/0168455 A1    Jun. 3, 2021

(51) Int. Cl.
H04N 21/475    (2011.01)
H04L 9/32    (2006.01)
H04N 21/41    (2011.01)

(52) U.S. Cl.
CPC ....... *H04N 21/4753* (2013.01); *H04L 9/3213* (2013.01); *H04L 9/3234* (2013.01); *H04N 21/4126* (2013.01)

(58) Field of Classification Search
None
See application file for complete search history.

(56) References Cited

U.S. PATENT DOCUMENTS

| 8,745,178 B2 | 6/2014 | Kinnis | |
|---|---|---|---|
| 9,060,273 B2 | 6/2015 | Brown et al. | |
| 2008/0022298 A1* | 1/2008 | Cavicchia | H04N 21/482 725/25 |
| 2011/0028094 A1* | 2/2011 | Masuda | H04W 12/06 455/41.2 |

(Continued)

FOREIGN PATENT DOCUMENTS

| WO | WO2009140988 | * 11/2009 |
|---|---|---|
| WO | 2012005994 A1 | 1/2012 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

*Primary Examiner* — Kaveh Abrishamkar
(74) *Attorney, Agent, or Firm* — Nathan M. Rau

(57) ABSTRACT

A system and method for providing content to a user outside of a home region. A portable device displays content to a user through a network connection. A home content provider provides content to the portable device from the home region. Some of the content provided is region restricted content. A location verifier determines that the portable device and the user are both physically located within the home region. The location verifier issues to the user a location token when the user and the portable device are in the home region. A token verifier verifies the location token when the user requests the region restricted content outside of the home region. The token verifier further instructs the home content provider to provide region restricted content to the user when the user has the location token.

20 Claims, 5 Drawing Sheets

(56) References Cited

U.S. PATENT DOCUMENTS

| | | | |
|---|---|---|---|
| 2013/0252583 A1* | 9/2013 | Brown | H04L 63/0807 |
| | | | 455/411 |
| 2015/0381452 A1* | 12/2015 | Deen | H04L 43/0876 |
| | | | 709/224 |
| 2017/0099260 A1* | 4/2017 | Cohn | G06F 9/384 |
| 2018/0205742 A1 | 7/2018 | Vinukonda et al. | |
| 2021/0056553 A1* | 2/2021 | Howard | G06Q 10/1095 |

* cited by examiner

CONTENT ACCESS BASED ON LOCATION TOKEN

BACKGROUND

The present disclosure relates to the presentation of content to a user, more specifically to providing region restricted content to a user when they are located outside of the region.

People often travel to different locations around the world, and due to region restrictions imposed on content are not able to access content that they would normally access at home. The individual may have no desire to access content that originates where they have traveled to. This can include reasons such as language barriers, a general desire to remain connected to their home, etc. Many people attempt to bypass the region restrictions on the content by connecting through a virtual private network that fakes their current location to make it seem as though they are connecting from their home location.

SUMMARY

Embodiments of the present disclosure are directed to a system for providing content to a user outside of a home region. The system includes a portable device displays content to a user through a network connection. A home content provider provides content to the portable device from the home region. At least a portion of the content provided by the home content provider is region restricted content. A location verifier determines that the portable device and the user are both physically located within the home region. The location verifier issues to the user a location token when the user and the portable device are in the home region. The user then travels outside of their home region and attempts to access the region restricted content. A token verifier verifies the location token when the user requests the region restricted content outside of the home region. The token verifier further instructs the home content provider to provide region restricted content to the user when the user has the location token.

Embodiments of the present disclosure are directed to a computer implemented process for providing content to a user outside of a home region. A request is received to register with a content provider for a location token. The content provider provides region restricted content in an electronic format to the user. The process determines that the location token can be issued to the user based on a physical location of the user. A location token is issued to the user when the user is physically in the home region. The process receives an attempt to access region restricted content by the user from a location outside the home region. The process further receives the location token from a portable device associated with the user. The location token is then validated. If the location token is valid the region restricted content is provided to the user. If the location token is not valid access to the region restricted content is denied. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
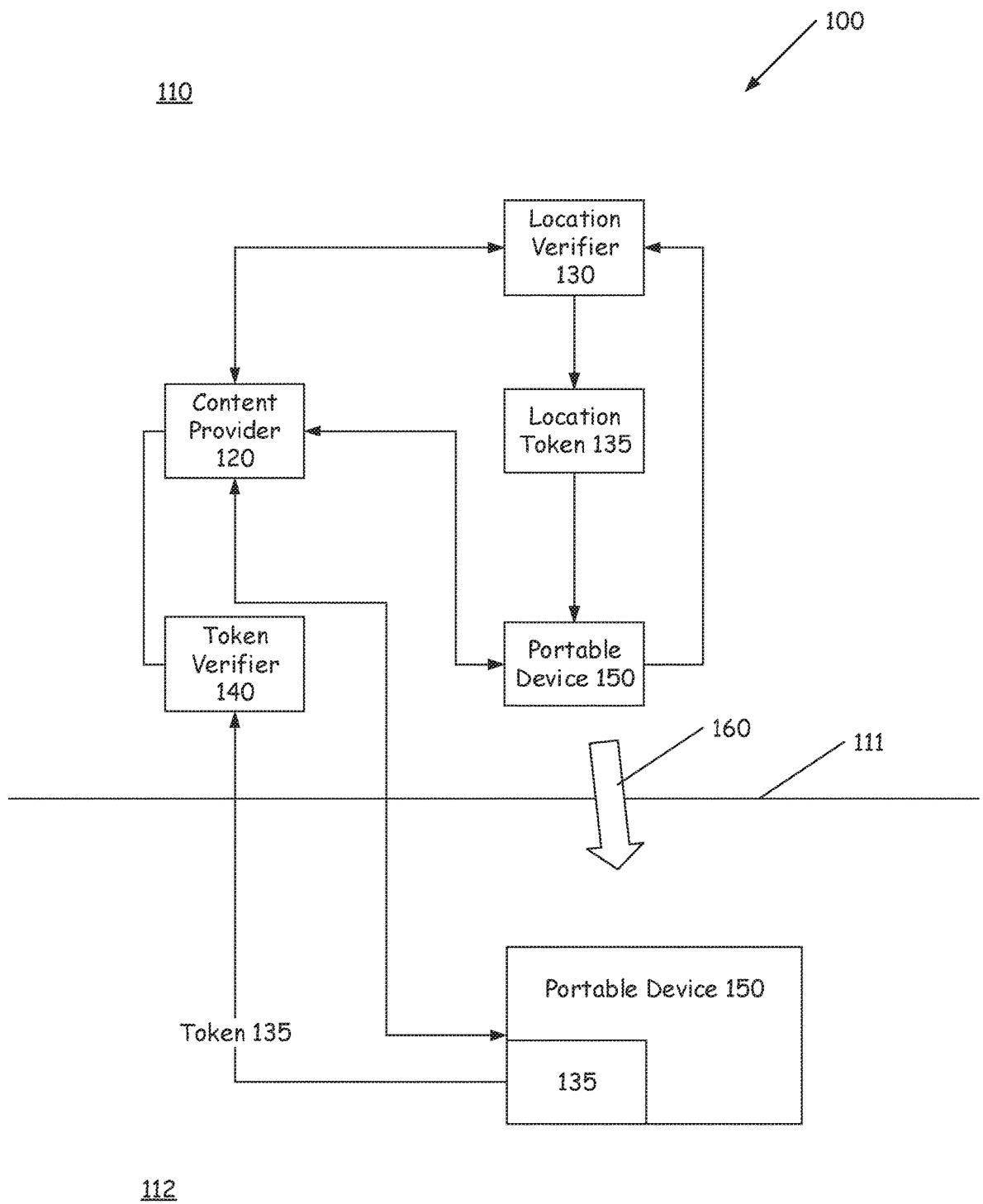
FIG. 1 is a block diagram of a system for providing access to content at a remote location that would not normally be accessible at that location, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to the presentation of content to a user, more specifically to providing region restricted content to a user when they are located outside of the region. While the present disclosure is not necessarily limited to such applications, various aspects of the disclosure may be appreciated through a discussion of various examples using this context.

Audio, visual, and print content that is provided to individuals is often time restricted to a particular region. Content providers are often limited in where, when, and how they can provide content to users. For example, in the United States, there are many television stations that provide content provided by a particular network. The network restricts each station to a particular region, and may limit the ability of one station providing content in an area that is covered by another station. For example, the NBC affiliate in Minneapolis, Minn. may not be allowed to provide their content to a consumer who is covered by the NBC affiliate located in Rochester, Minn. However, there are instances where the coverage of the two stations overlap. In some instances the Rochester NBC affiliate may request that other content providers, such as a cable company, block the Minneapolis NBC affiliate's content to protect an advertising stream or when they are showing competing content. In some instances the blocking would affect a consumer who is an area where the two stations overlap in their regional coverage. If the two networks are showing different content, such as two different sporting events, the consumer may not be able to watch content that they would otherwise be allowed to watch, but for the blocking.

Further, people often travel to locations around the world, and due to region restrictions are not able to access content that they would normally access at home. The individual may have no desire to access content that originates where they have traveled to. This can include reasons such as language barriers, a general desire to remain connected to their home, etc. For example, a person from the United Kingdom who is traveling to the United States is unable to access content provided by the BBC while they are in the United States. However, the individual may desire to keep up with the current status of Brexit or other local event in the United Kingdom, while traveling in the United States, but the content such as live news from the BBC in the United Kingdom is not available in the United States due to region restrictions. Further, as Brexit is not a popular news item in the United States, the individual would not be able to get this information easily from sources located in the United States.

FIG. 1 is a block diagram of a system 100 for providing access to content at a remote location 112 that would not normally be accessible at that location. System 100 includes home region 110 and a remote location 112. System 100 includes a home content provider 120, a location verifier 130, a token verifier 140, a portable device 150, and a network 160.

Home region 110 is a region where a user of the portable device 150 normally receives content. For example, the home region 110 can be North America, the United States, Canada, and/or a more specific location such as a town or state/province. The home location has content that is provided to the user that is restricted to that region, and not available to users who are located outside of the home location. The remote location 112 is any other region of the world that is not the home location.

The home content provider 120 is a provider of content to the user. The content can be video, audio, print, or any other digital content that can be provided to the user for consumption on the portable device 150. For example, the home content provider 120 can be a newspaper, a television station, a television network, a cable or satellite provider, a streaming service, such as Netflix, Amazon, Disney+, AppleTV, Hulu, Pandora, Spotify, etc. The content provider 120 has content that includes region restricted content. Content may be restricted for a variety of reasons. For example, the owner of the content being provided by the home content provider 120 may impose distribution limitations on the content that prevents the home content provider 120 from providing the content outside the home region 110. The content provider 120 may have agreements with different content provider 120s that give the rights to a particular content to one content provider 120 in one region and another content provider 120 in another region. In some instances, the content provided by the content provider 120 can be restricted by a government or other authority from being provided within the region controlled by that authority. For example, a government may find that a particular piece of content is offensive or subversive to their community, and therefore, do not want its subjects to have access to that content. However, it may be permitted in that region for "non-residents" or visitors to view that particular content. In these instances, the content provider 120 may not be able to differentiate persons who are allowed to have the content in that area and those that are not, and as a result may choose to block delivery of that content to any user located in that particular region. Until such time as the content provider 120 receives a confirmation that the user has a valid location token, the content provider 120 will not provide region restricted content outside of the home region 110.

Location verifier 130 is a component of the system 100 that verifies that user is in a particular location. The location verifier 130 can be part of a system within the content provider 120, or the location verifier 130 can be a separate service that is provided to the user. The user interacts with the location verifier 130 to request the issuance of a location token 135 that will permit the user to view region restricted content outside of the home region 110. The interaction with the location verifier 130 can be done through a user interface that is provided to the user either by the location verifier 130 or the content provider 120. For example, the content provider 120 can through, for example, an account management portal, allow the user to request a location token. The user can simply check a box indicating that they desire a location token.

The location verifier 130 determines where the user is located, and uses this information to determine if and when to issue to the user a location token. The location verifier 130 obtains information from the user's portable device 150, as well as, the network connection that the user is using to access the location verifier 130. This information can include, for example, a MAC address for the portable device 150, an account number associated with the content provider 120, passwords, date, IP address, etc. Based on the information received from the user's portable device 150, the location verifier 130 determines whether or not to issue to the user a location token. The location verifier 130 verifies that the user is located in a particular region. In some embodiments the location is verified using the IP address that the portable device 150 is connecting with the location verifier 130. In some embodiments, the location verifier 130 will not verify a connection that is secured through a VPN, or similar connections where the user can "fake" their location so as to appear as though they are located somewhere they are not. In some embodiments, the location verifier 130 can use a two-factor authentication to ensure the user is located where they claim to be. For example, the operator of the location verifier 130 can send a letter containing an authorization code to the user to a physical address associated with the user. The user would then enter this code back to the verifier to confirm that they received it. In some embodiments, the location verifier 130 can access a GPS receiver on the portable device 150, and use the GPS information to verify the location of the user within the correct region.

The location token 135 is a token that is provided to the user to allow the user to access the region restricted content at the remote location 112. The token 135 can, in some embodiments, be tied to a specific user device. In this instance, the characteristics of the user device are associated with the token 135 and can be used in the validation process of the token. In some embodiments, the token 135 can be portable between user devices, or associated with multiple user devices. In some embodiments, the token 135 can allow access to all of the region restricted content. However, in other embodiments, only a subset of region restricted content can be unlocked by the token. The token 135 can be provided to the user as an electronic download that the user would download to the particular portable device 150 that they wish to receive the content. In some embodiments, the token 135 or the code to unlock the token 135 can be mailed to the physical address of the user. In this way the location verifier 130 can enact a second layer of security in ensuring that the token 135 is provided to a user in the correct region. In some embodiments, the token 135 is configured to expire. The token 135 can expire after a predetermined period of time, such as after a week, after 30 days, or any other period of time. In some embodiments, the token 135 can expire after a predetermined number of accesses of region restricted content. For example, the token 135 can expire after the user access 10 region restricted pieces of content. Once the token 135 has expired, the user cannot access the region restricted content outside of the region until they renew the token. The token 135 can only be renewed by returning back to the home region 110, and revalidating the token 135 by reperforming the process that was used to generate the token 135 in the first instance.

The token verifier 140 is a component of the system 100 that verifies that a presented token 135 is valid. The token verifier 140 receives a copy of the token 135 when the user attempts to access content from the content provider 120 that is not available in the remote location 112. The token verifier 140 verifies that the presented token 135 is valid by comparing information associated with the token 135 with information obtained during the issuance of the token. This information can be stored in a database associated with the location verifier 130, or can be extracted from the token 135 itself. If the token 135 is identified as valid the token verifier 140 communicates with the content provider 120 that the user has been validated and therefore, the content provider 120 is then able to provide the region restricted content to the user and their portable device 150. If the token 135 is not validated or is determined to be expired, the user will not be able to access the region restricted content.

The portable device 150 is a device that the user receives content through. The portable device 150 is, as the name implies, portable in that the user can and usually does take the device to different locations. The portable device 150 can be a mobile phone, a laptop computer, a tablet, or any other portable electronic device that can provide content to the user. The portable device 150 has one or more applications that allow the user to access content from the content provider 120. These applications can include apps that are specific to the content provider 120, or can be generic applications, such as a web browser that allows the user to connect with the content provider 120. The portable device 150 also includes one or more ways to connect to a network. These connections can include one or more of cellular connections, Wi-Fi connections, Bluetooth connections, wired network connections, wireless network connections, etc. The network is a computer infrastructure that allows the portable device 150 to connect and communicate with at least the content provider 120.

Figure 2:
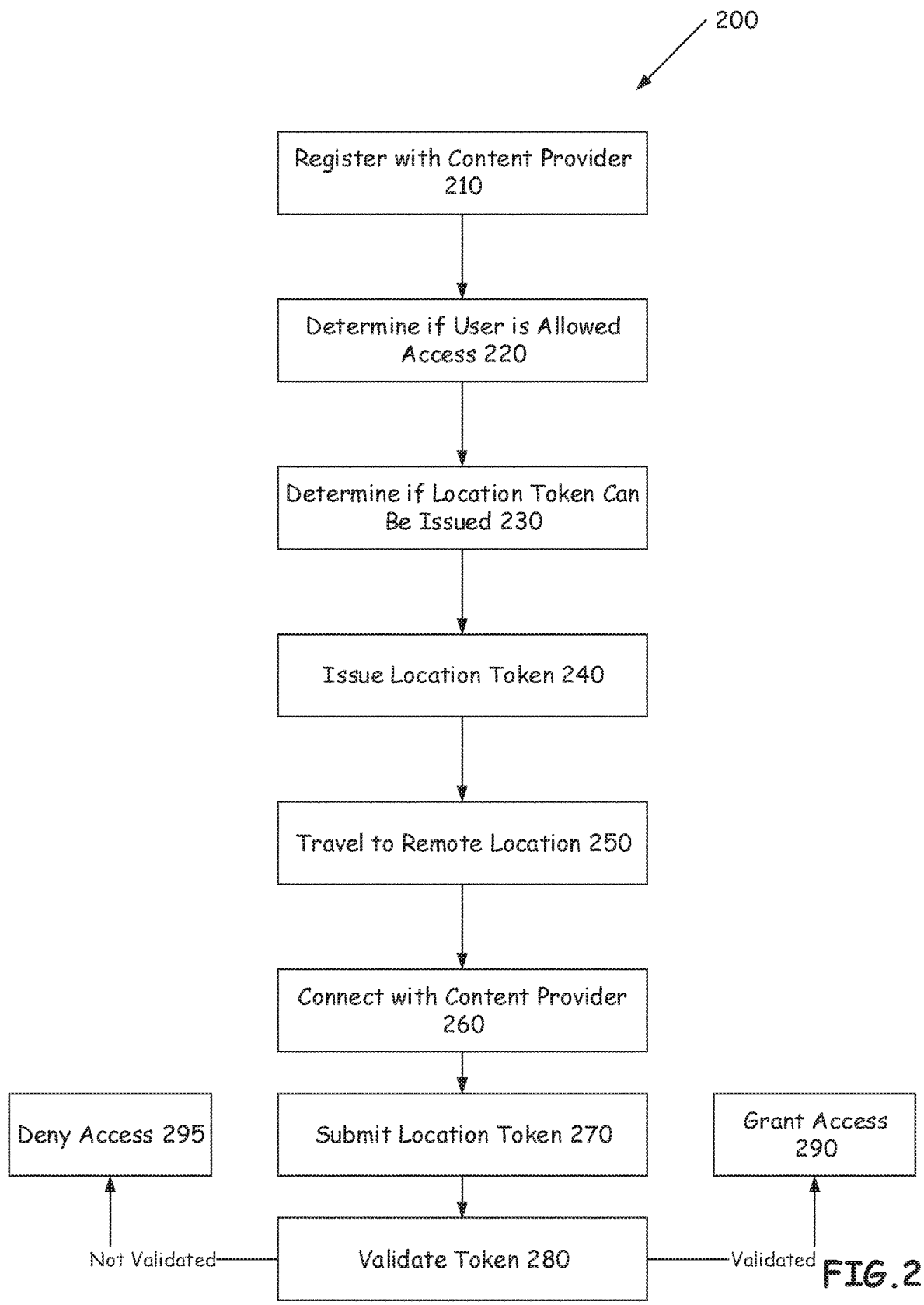
FIG. 2 is a flow chart of a process for providing location restricted content to a user who is outside the restricted area for the content according to embodiments.

FIG. 2 is a flow chart of a process for providing location restricted content to a user who is outside the restricted area for the content, according to illustrative embodiments. The user begins the process by registering or signing up with at least one content provider 120 that provides region restricted content. This is illustrated at step 210. As discussed above, region restricted content is content that a content provider 120 cannot provide outside of a designated region. This may be for licensing or other reasons. During the registration process the user can request to view the region restricted content at a location outside of the region where the content is restricted to. In some embodiments the user can make a request for access to content in a specific region. For example, the user can request to view content restricted to the United States in Europe. In another example, the user can request to view content from the United Kingdom in the United States. In some embodiments, the user can request access to region restricted content without restriction to what region they wish to view the content in.

Once the user has requested access to the region restricted content the content provider 120 then needs to verify that the user is allowed to request access to the region restricted content. This is illustrated at step 220. The content provider 120 can compare the user's provided credentials to an account associated with the user. If the user has an account, the content provider 120 then can determine that they are permitted to access the restricted content. The content provider 120 can determine for example, if the user has paid for access to the content, has a valid subscription to the content, or is otherwise entitled to access the content. Conversely if the user does not have an account or is not entitled to the restricted content the content provider 120 will deny the request.

Once the content provider 120 has determined that the user is entitled to access the content provider 120 then proceeds to determine if a location token 135 can be issued to the user. This is illustrated at step 230. The content provider 120 accesses a location verifier 130 to determine where the user is physically located. As discussed above the location verifier 130 can be part of the content provider 120 or can be a separate service that is provided to the content provider 120. The location verifier 130 determines the physical location of the user at the time of the request. In some embodiments, the location provider obtains information from the user's portable device 150, as well as, the network connection that the user is using to access the location verifier 130. This information can include, for example, a MAC address for the portable device 150, an account number associated with the content provider 120, passwords, date, IP address, etc. In some embodiments, the location verifier 130 will not verify a connection that is secured through a VPN, or similar connections. In some embodiments, the location verifier 130 can require that the user connects to the verifier using a piece of equipment provided by the content provider 120, such as a specific router. In some embodiments, a two-factor authentication can be used to confirm the location of the user in the correct region. For example, a letter containing an authorization code can be sent to the user to their registered physical address. In some embodiments, the location verifier 130 can access a GPS receiver on the portable device 150, and use the GPS information to verify the location of the user within the correct region during the request.

If the user is determined to be in their home location, then a location token 135 is issued to the user. This is illustrated at step 240. The token 135 can be provided to the user as an electronic download that the user would download to the particular portable device 150 that they wish to receive the content. In some embodiments, the token 135 or the code to unlock the token 135 can be mailed to the physical address of the user. In this way a second layer of security is provided in ensuring that the token 135 is provided to a user in the correct region.

Once the user has been granted the location token, the user will have to leave their home region 110 and travel to a different region. This is illustrated at step 250. The user then attempts to connect to the content provider 120 through a network connection in the remote location 112. This is illustrated at step 260. As the user is now in a region where the region restricted content is not available when the user attempts to access the content provider 120, the content provider 120 can initially inform the user that the content is not available in their current region. The content provider 120 can provide this message to the user on the screen of their mobile device. This can be provided as a pop-up window that indicates that the content is not available, on a portion of the screen where the content would normally be provided, or any other way of notifying the user that the content is not available.

In response to receiving the notice that the content is not available in current region, the user submits to the content provider 120 the location token. This is illustrated at step 270. The user can manually submit the location token 135 to the content provider 120 through a portal that is provided by the content provider 120. In some embodiments the content provider 120 can provide a notification to the user, that the restricted content can be viewed by submitting the token. In this instance the user then submits the token 135 in response to the prompt. In some embodiments, the notification can be combined with the notification that the content is not available. In this instance the user also submits the token 135 in response to the prompt. In some embodiments, the content provider 120 can probe the portable device 150 to obtain the token. In some embodiments, the token 135 is provided to the content provider 120 before the user attempts to access the restricted content. In this instance, the content provider 120 does not provide any notification to the user that the content is restricted, nor does the content provider 120 request the token.

Once the content provider 120 receives the token 135 from the user, the token 135 is validated. This is illustrated at step 280. The content provider 120 provides the received token 135 to the token verifier 140 in order to validate the token. The token verifier 140 verifies that the presented token 135 is valid by comparing information associated with the token 135 with information obtained during the issuance of the token. This information can be stored in a database associated with the location verifier 130, or can be extracted from the token 135 itself. In some embodiments the token verifier 140 also checks that the particular token 135 has not expired or timed out. If the information matches the token verifier 140 determines that the presented token 135 is valid. If the information does not match or the token 135 is expired, the token verifier 140 determines that the token 135 is now invalid. In some embodiments, the validation process can include two-factor authentication. In this approach, once the token 135 is determined to be valid, a second contact is made with the user. This second contact can contain a code that the user will need to enter to receive the content. This "code" can be sent to the user device, or can be sent to a second device associated with the user. Once the user enters in the correct code, the validation process is completed.

If the token 135 was successfully validated, the user is then provided the content from the content provider 120 in the remote location 112. This is illustrated at step 290. If the token 135 was not validated, or the content cannot for whatever reason be provided at that region, the content provider 120 provides a message indicating that the content cannot be viewed. This is illustrated at step 295. In some embodiments, the message can inform the user of the reason as to why the token 135 was determined to be invalid. For example, the token 135 may have expired, and the user would be informed that their token 135 has expired and that they will need to revalidate the token 135 in their home region 110.

Figure 3:
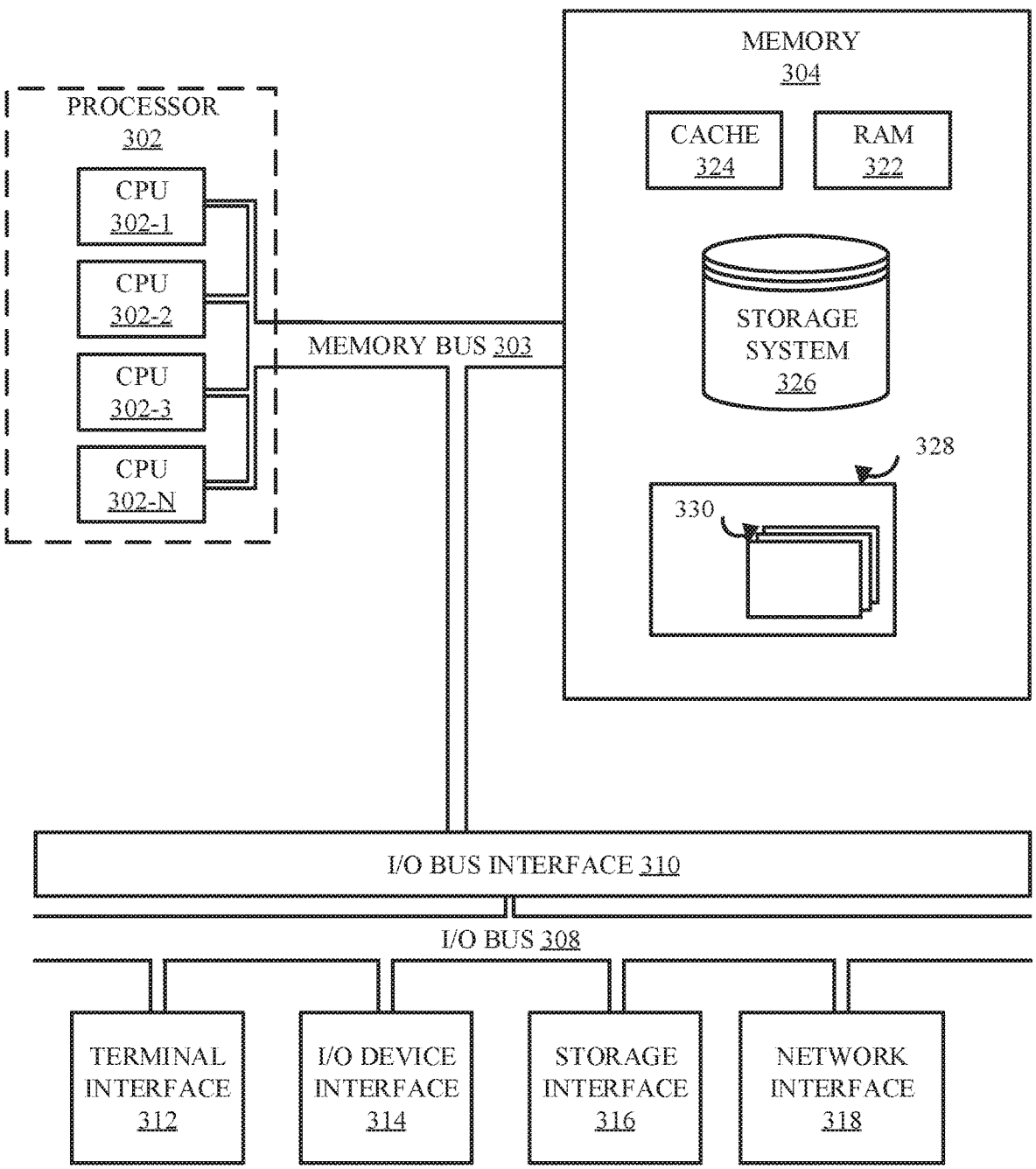
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
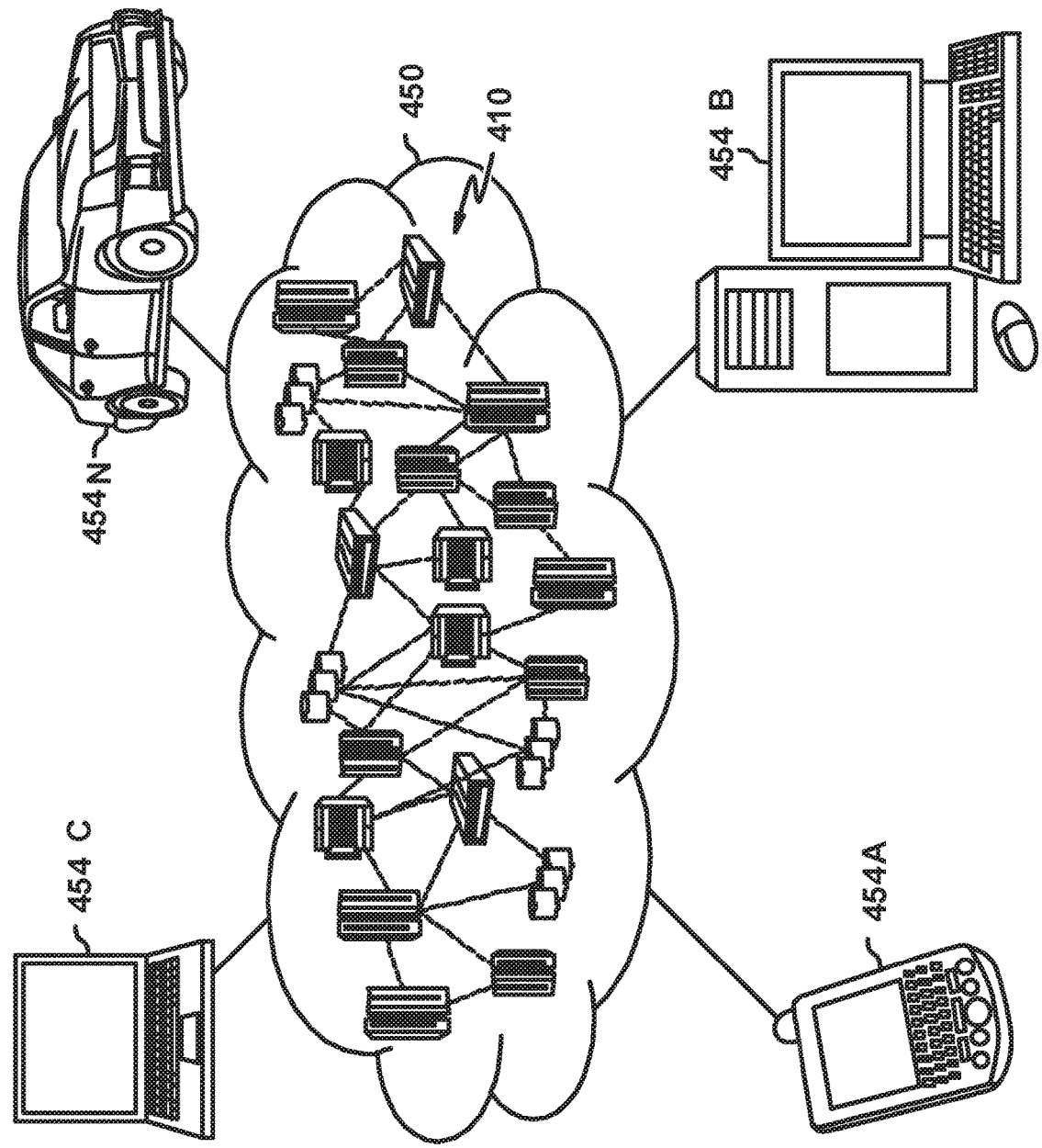
FIG. 4 is a diagrammatic representation of an illustrative cloud computing environment.

The system 100 may be employed in a cloud computing environment. FIG. 4 is a diagrammatic representation of an illustrative cloud computing environment 450 according to one embodiment. As shown, cloud computing environment 450 comprises one or more cloud computing nodes 454 with which local computing devices used by cloud consumers, such as, for example, personal digital assistant (PDA) or cellular telephone 454A, desktop computer 454B, laptop computer 454C, and/or automobile computer system 454N may communicate. Nodes 454 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 454 and cloud computing environment 450 may communicate with any type of computerized device over any type of network and/or network addressable connection (e.g., using a web browser).

Figure 5:
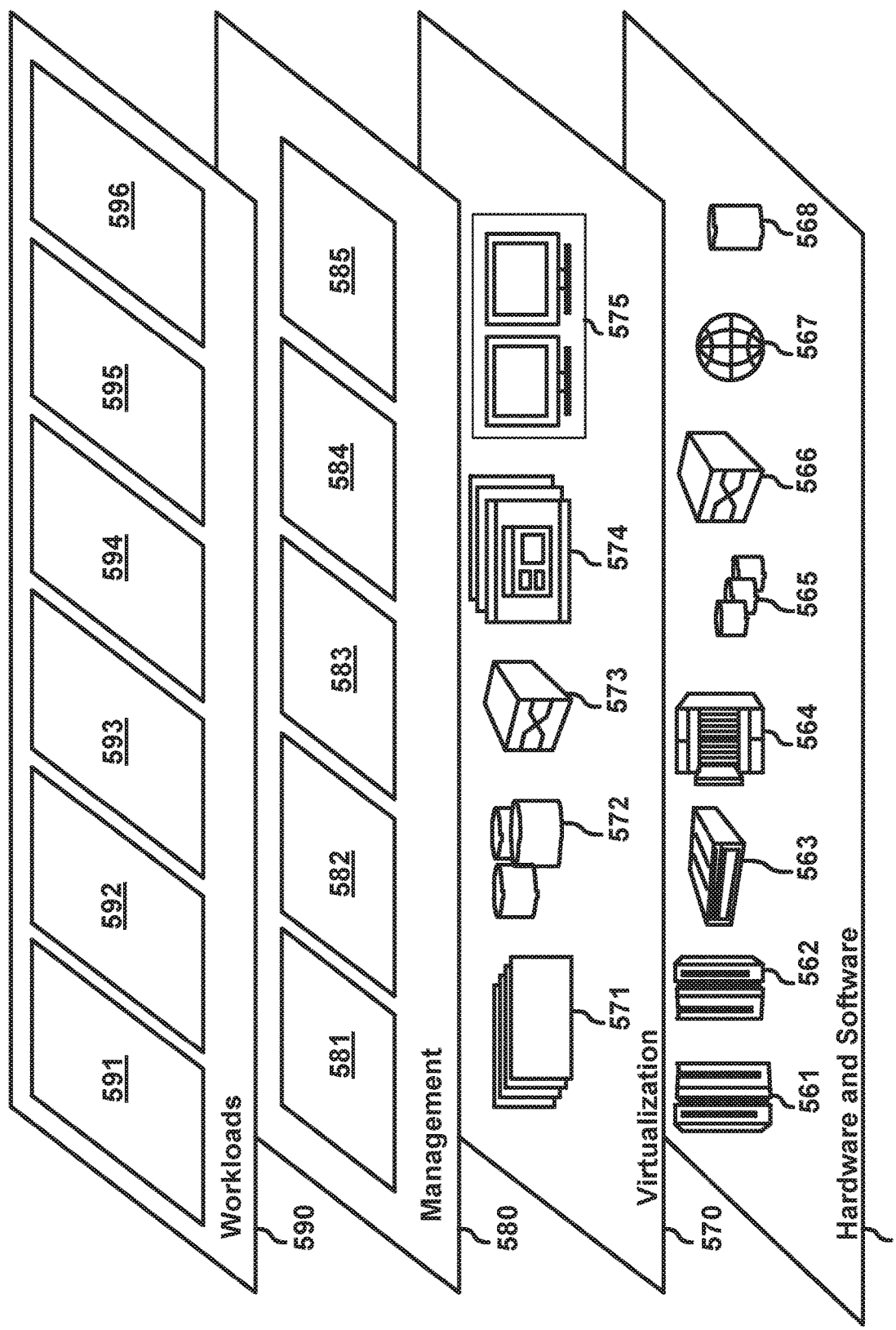
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for providing content to a user outside of a home region, comprising:
   a portable device configured to display content to a user through a network connection;
   a home content provider configured to provide content to the portable device from the home region, wherein at least a portion of the content is region restricted content;
   a location verifier configured to determine that the portable device and the user are both physically located within the home region, and in response issue to the user a location token; and
   a token verifier configured to verify the location token in response to the user requesting region restricted content outside of the home region from the home content provider and instructs the home content provider to provide region restricted content to the user.

2. The system of claim 1 wherein the location verifier is further configured to verify the physical location of the portable device through the network connection.

3. The system of claim 2 wherein the location verifier is further configured to not verify a location when the network connection is through a virtual private network.

4. The system of claim 1 wherein the location token has a limited period of validity.

5. The system of claim 4 wherein the location token can only be revalidated after expiration when the portable device is physically located within the home region.

6. The system of claim 1 wherein the location token is tied to the portable device.

7. The system of claim 1 wherein the location token is portable between user devices associated with the user.

8. The system of claim 1 wherein the location verifier is configured to execute two-factor authentication of the physical location of the user.

9. The system of claim 8 wherein a portion of the two-factor authentication includes sending a letter to a physical address of the user containing an authorization code.

10. A method for providing content to a user outside of a home region, comprising:
    receiving a request for registering with a content provider for a location token, the content provider providing region restricted content in an electronic format to the user;
    determining that the location token can be issued to the user based on a physical location of the user;
    issuing the location token to the user when the user is physically in the home region;
    receiving an attempt to access region restricted content from a location outside the home region;
    receiving the location token from a portable device associated with the user;
    validating the location token;
    providing the region restricted content to the user in response to validating the location token; and
    denying access to the region restricted content upon failure of validating the location token.

11. The method of claim 10 further comprising:
    determining a physical location of the user during the request for the location token.

12. The method of claim 10 wherein determining the physical location of the user further comprises:
    employing two-factor authentication to determine the physical location of the user.

13. The method of claim 11 wherein determining the physical location determines the physical location of the user through a network connection of the portable device.

14. The method of claim 13 wherein the physical location is not determined when the network connection is through a virtual private network.

15. The method of claim 10 wherein validating the location token determines if the location token has not expired.

16. The method of claim 15 wherein validating the location token includes performing a second authentication in response to the location token being valid.

17. The method of claim 10 wherein receiving the location token further comprises:
    probing the portable device by the content provider to locate the location token on the portable device.

18. The method of claim 10 further comprising:
    renewing an expired location token by returning to the home region.

19. The method of claim 10 wherein the location token is tied to a specific portable device of the user.

20. A computer program product having computer executable instructions that when executed by at least one computing device cause the at least one computing device to execute instructions to:

receive a request for registering with a content provider for a location token, the content provider providing region restricted content in an electronic format to the user, wherein the region restricted content is content that is actively restricted based on a physical location of the user by a controlling entity;

determine that the location token can be issued to the user based on the physical location of the user;

issue the location token to the user when the user is physically in the home region;

receive an attempt to access region restricted content from a location outside the home region;

receive the location token from a portable device associated with the user;

validate the location token;

provide the region restricted content to the user in response to validating the location token; and deny access to the region restricted content upon failure of validating the location token.

* * * * *